United States Patent Office 3,320,634
Patented May 23, 1967

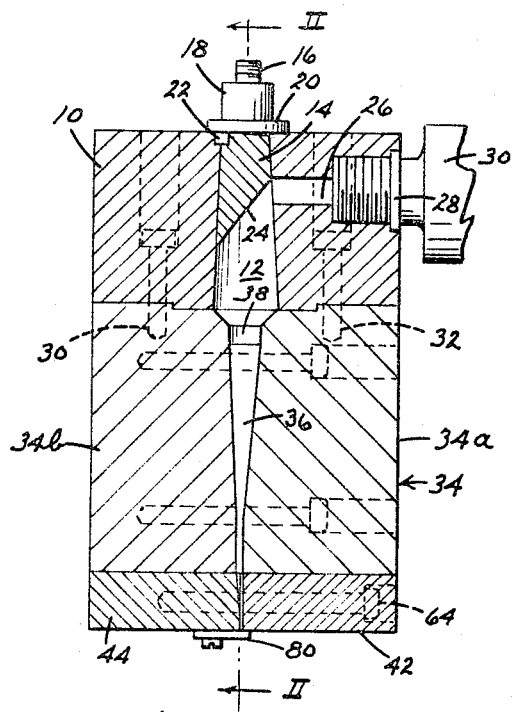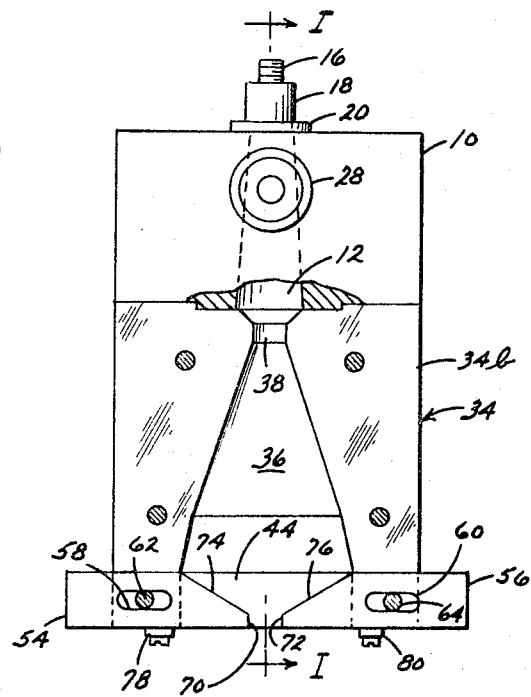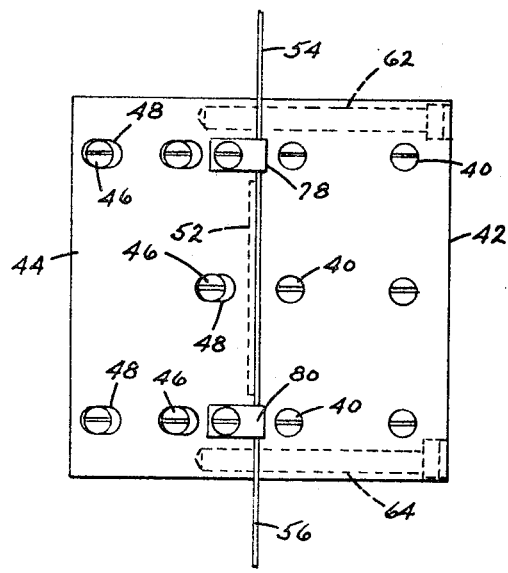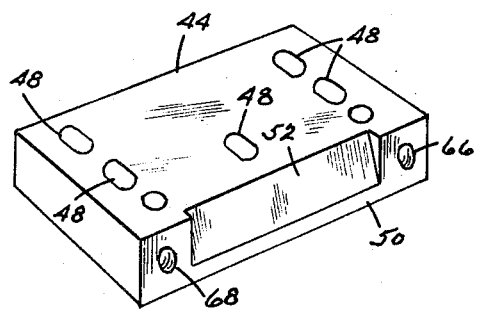

3,320,634
DIE ASSEMBLY
Daniel J. Ryan and Alfonso W. Simaska, Chester, Pa., assignors to FMC Corporation, Philadelphia, Pa., a corporation of Delaware
Filed Aug. 10, 1965, Ser. No. 478,696
1 Claim. (Cl. 18—12)

The present invention relates to an extrusion die assembly especially adapted for forming a relatively narrow strip from a plasticized material such as a molten thermoplastic polymer, more particularly the invention relates to a die or extrusion apparatus useful in the production of molecularly oriented polymeric strapping.

Molecularly oriented polymeric strapping has high tensile strength, a controllable amount of extensibility, light weight, oxidation and acid resistance and other properties which make it ideally suited in the packaging field after the manner of the well-known and long used steel band strapping. There are several known ways of making such strapping; on of the commercial methods involving extruding the molten polymer, for example polypropylene or nylon, through a substantially rectangular orifice only somewhat larger than the desired cross section of the finished strap and then stretching the extrudate to several times its length to accomplish the desired degree of molecular orientation. The stretching of course reduces the cross section but for any particular amount of stretch the final cross sectional dimensions are directly related to the cross section of the strap as it leaves the die or orifice. However, a particular die does not necessarily produce an unstretched strap of particular cross sectional dimensions. The size of the strap emerging from the die depends to some extent upon the viscosity of the material being extruded and the viscosity depends upon both the temperature and the "melt flow rate" or "melt index" of the polymer. For a particular polymer, for example polypropylene having a nominal melt flow rate of 0.8 the actual melt flow rate may vary from 0.7 to 0.9 from batch to batch and from manufacturer to manufacturer. To produce an unstretched strap of particular cross sectional dimensions from a polymer having a melt flow rate of 0.7, a slightly larger die opening or a die having a different internal structure is required than when the melt flow rate is 0.9, provided of course that the temperatures are the same. It is important that the dimensions of the strapping be maintained within close tolerances, particularly when it is to be used with automatic strapping machinery and it will therefore be appreciated that it is desirable to be able to vary the size of the die opening and/or the internal structure of the die without undue difficulty or expense.

It is therefore the primary object of this invention to provide a die assembly for extruding a relatively narrow strip wherein the dimensions of the die opening and/or the internal configuration in the vicinity of the opening may be varied with facility.

Other and further objects, features and advantages of the invention will become apparent as the description of a preferred embodiment thereof proceeds.

Referring now to the drawing:

FIG. 1 is a vertical section through the center of the die assembly taken along the line I—I of FIG. 2;

FIG. 2 is a view of the die assembly partially along the line II—II of FIG. 1 and partially in side elevation;

FIG. 3 is a plan view of the bottom of the die assembly and;

FIG. 4 is a perspective view of one of the shaping plates on the face of the die assembly.

The apparatus comprises an upper block 10 containing a chamber 12 formed by cutting a tapered circular hole through the block. The upper end of the chamber is sealed by a tapered plug 14 which is inserted through the larger bottom end of the chamber. Plug 14 is provided with a threaded shank 16 and is held in place by a nut 18 screwed onto the shank. To prevent the plug from rotating when nut 18 is tightened, a washer 20 is first placed around the shank 16 and a pin 22 on the washer is engaged within complementary cut-outs provided in the plug and in the top of block 10. The bottom 24 of the plug extends at an angle to the longitudinal center line of chamber 12 and in line with the highest point of bottom 24 block 10 is provided with a horizontally extending bore 26 the outer end which is threaded for reception of a fitting 28 of an adapter 30 which supplies the molten plastic material from a suitable extruder. As the plastic material emerges from bore 26 it is directed downwardly into chamber 12 by the sloping bottom 24 of the plug.

Secured to upper block 10 by bolts 30 and 32 is a section indicated generally at 34 comprising a pair of blocks 34a and 34b rigidly secured together by bolts or the like as shown. The facing areas of blocks 34a and 34b are complementarily cut away to provide a passageway 36 which at the top is circular and contiguous with the bottom of chamber 12. From the top, passageway 36 tapers inwardly to a circular neck 38 and then tapers inwardly in one direction as shown in FIG. 1 and flares outwardly at right angles thereto as shown in FIG. 2. Thus the plastic material is gradually spread into flat formation as it moves down passageway 36. The bottom end portion of the passageway is substantially rectangular and for ease of manufacture this portion is cut entirely in the block 34b, although it will be appreciated that it could be cut partially in block 34b and partially in block 34a. In the appended claims the assembly of blocks, 10, 34a and 34b is referred to as the "pressure head." The bottom face of the pressure head is flat and the rectangular lower end of passageway 36 opens through substantially the middle of the flat bottom face.

Fixedly secured to the bottom of block 34a as by means of bolts 40 is a shaping plate 42. Plate 42 is coextensive with the bottom of block 34a and one edge or side thereof is aligned with one of the long sides of the rectangular slot at the bottom of passageway 36. A second shaping plate 44, shown in perspective in FIG. 4 is adjustably secured to the bottom of block 34b. Plate 44 is tightened in position by bolts 46 which extend through elongated openings 48 in the plate and screw into block 34b. Plate 44 has an edge or face 50 which extends parallel to the adjacent face of plate 42. The distance between the faces of plates 42 and 44 determines the thickness of the extruded strip and this distance is less than the thickness of the slot at the bottom of passageway 36. To provide for a smooth flow of the plastic material between the shaping plates, plate 44 is cut away to provide a sloping wall 52 the upper end of which, in normal adjusted positions of plate 44, is substantially aligned with one of the long sides of passageway 36.

Determinative of the width of the extruded strip are a pair of deckle plates 54 and 56 which are sandwiched between shaping plates 42 and 44. Deckle plates 54 and 56 are provided respectively with slots 58 and 60. Threaded members such as bolts 62 and 64 extend through the slots and through openings in shaping plate 42 and screw respectively into threaded openings 66 and 68 in shaping plate 44. When bolts 62 and 64 are tightened, the shaping plates are squeezed against the deckle plates so that the flow of plastic material is confined to the area between the spaced apart inner ends of the deckle plates. Bolts 46 are not tightened until after bolts 62 and 64.

The inner ends of the deckle plates 54 and 56 include respectively outer segments 70 and 72 which extend parallel to the centerline of passageway 36 and inner segments 74 and 76 which flare outwardly toward the ends of the rectangular opening of the passageway. The flared inner segments direct the plastic flow gradually toward the straight outer segments to avoid sharp pockets in which the plastic material could stagnate and harden. The outer ends of the deckle plates extend beyond the outer edges of the shaping plates and the pressure head whereby they may be adjusted in and out without removing the shaping plates. These adjustments will normally be slight but are necessary in maintaining strip width when the melt index or melt flow rate of the polymer changes.

One factor in determining the width of the extruded strip is the length of the segments 70 and 72 of the deckle plates. An increase in viscosity of the material will cause a narrowing of the extruded strip due to the friction between the material and the segments 70 and 72. With the hereindescribed apparatus it is an easy matter to remove the deckle plates and replace them with ones wherein the segments 70 and 72 are longer or shorter, as may be desired. Also deckle plates of different thickness may readily be employed when it is desired to change the thickness of the extruded strip.

The internal pressure in the die is apt to be quite high and there is a tendency for the deckle plates to pivot about bolts 62 and 64. To prevent this, tabs 78 and 80 are secured to the outer face of the shaping plate 44 so as to overlie respectively the outer edges of deckle plates 54 and 56.

Having thus described a preferred embodiment of the invention, what is claimed is:

A die assembly for extruding a plastic material to form a relatively narrow strip of substantially uniform thickness comprising a pressure head having a pressure chamber therein, said pressure head having a flat face, a restricted passageway in said head leading from said pressure chamber and having a substantially rectangular opening through substantially the center of the flat face thereof, a first shaping plate fixedly secured to the flat face of said pressure head, said shaping plate having a flat edge aligned with one of the long sides of the rectangular opening of said passageway, a second shaping plate having a flat edge extending parallel to the flat edge of said first shaping plate, means adjustably securing said second shaping plate to the flat face of said pressure head, said last named means permitting the second shaping plate to be moved toward and away from the flat edge of the first shaping plate, a pair of deckle plates sandwiched between said shaping plates, said deckle plates having planar sides juxtaposed the flat faces of said shaping plates, said deckle plates having spaced apart inner ends which determine the width of the extruded strip, said deckle plates forming a continuous surface with the pressure head so as to lead the plastic material to the die exit without producing dye spots, an opening through each of said deckle plates, said openings being elongated longitudinally of the deckle plates, a bolt extending through each of said openings, said bolts extending through said first shaping plate and being screwed into said second shaping plate whereby the shaping plates are squeezed against the flat sides of the deckle plates to prevent leakage of the plastic material, and means secured to one of said shaping plates and overlying the deckle plates inwardly of said bolts to prevent the deckle plates from being pivoted about the bolts due to the pressure of the extruded plastic.

References Cited by the Examiner

UNITED STATES PATENTS

| | | | |
|---|---|---|---|
| 2,365,326 | 12/1944 | Bailey | 18—18 XR |
| 2,754,544 | 7/1956 | Bicher | 18—12 XR |
| 3,018,515 | 1/1962 | Sneddon | 18—12 |
| 3,085,289 | 4/1963 | Van Riper | 18—12 |
| 3,107,191 | 10/1963 | Brownold | 18—12 XR |
| 3,132,377 | 5/1964 | Allenbaugh et al. | 18—12 |

WILLIAM J. STEPHENSON, *Primary Examiner.*